April 2, 1940.  T. O. R. DAHLBERG  2,195,719
CALCULATING MACHINE
Filed Feb. 24, 1937   6 Sheets-Sheet 2

TORD OLOF RICKARD DAHLBERG
INVENTOR
By Otto Munk
His Att'y.

April 2, 1940.   T. O. R. DAHLBERG   2,195,719
CALCULATING MACHINE
Filed Feb. 24, 1937   6 Sheets-Sheet 3

TORD OLOF RICKARD DAHLBERG
INVENTOR

By Otto Munk
His Att'y.

| NO. | 0 | 20 | 40 | 60 | 80 | 100 | 120 | 140 | 160 | 180 | 200 | 220 | 240 | 260 | 280 | 300 | 320 | 340 | 360 |
|---|---|---|---|---|---|---|---|---|---|---|---|---|---|---|---|---|---|---|---|
| 69 | | | | Rails 67 and racks 1 to Rack 3 9 to zero | | | Rails 67 held in upper position | | | | Rails 67 down | | Rails 67 and rack 1 in zero position | | | | | | |
| 77 | | | | | | | | | Wheel 10 moves into mesh with racks 1-9 | Wheel 10 in mesh with racks 1-9 | | | out | | | | | | |
| 82 | Wheels 7 in mesh with rack 3 | | | | | | out | | | | | | | | | | In | | |
| 83 | | | | | | | | | | | | | | | | | | | |
| 86 | | Storage moves upward | | | | | | | | | | | | | | | | | |
| 87 | | | | | | | | | | | | | | | | Storage downward | | | |
| 108 | | | | | | | | | | | | | Tens Transfer | | | | | | |
| 109 | | | | | | | | | | | | | | Lever 102 restored | | | | | |
| 118 | | | | | | | | | | | | | Bails 6 in out | | In | | | | |

Tord Olof Richard Dahlberg
INVENTOR

Patented Apr. 2, 1940

2,195,719

UNITED STATES PATENT OFFICE 2,195,719

CALCULATING MACHINE

Tord Olof Rickard Dahlberg, Stockholm, Sweden, assignor to Kooperativa Förbundet, Förening u. p. a., Stockholm, Sweden Application February 24, 1937, Serial No. 127,339
In Sweden August 4, 1934

5 Claims. (Cl. 235—6)

This application is a continuation in part of my application, Serial No. 33,934, filed July 31, 1935.

This invention relates to improvements in calculating machines and has for its object to provide a calculating machine, cash register or the like equipped with a single accumulator and a plurality of storage sets.

The accumulator of the present machine may consist of a plurality of wheels equipped with a transfer mechanism, and actuated by a differential mechanism; the storage sets may each consist either of a plurality of pinions, or racks. The totals are accumulated by the accumulator and transferred to a selected storage set representing a given account. When further entries are to be made in the same account the value standing on the given storage set is transferred to the accumulator, whereupon the desired entries are accumulated in the latter and upon completion of the entries the new accumulated value is again transferred to the storage set.

Two embodiments of the invention are illustrated in the accompanying drawings, in which the invention is assumed to be used in a cash register.

Fig. 3 is a fragmentary view of the storage mechanism,

Fig. 4 shows the accumulating wheel and the tens transfer device,

Fig. 5 illustrates the driving elements of the indicator registering the additional values entered in the accumulating system, Fig. 6 shows a guide element for the storage carrier and the release mechanism for the selected storage member, Fig. 7 is a view of the driving elements oscillating the storage carrier, Fig. 8 shows parts of the account selector mechanism, and Fig. 9 illustrates the driving elements of the entry mechanism.

Figures 1, 2:
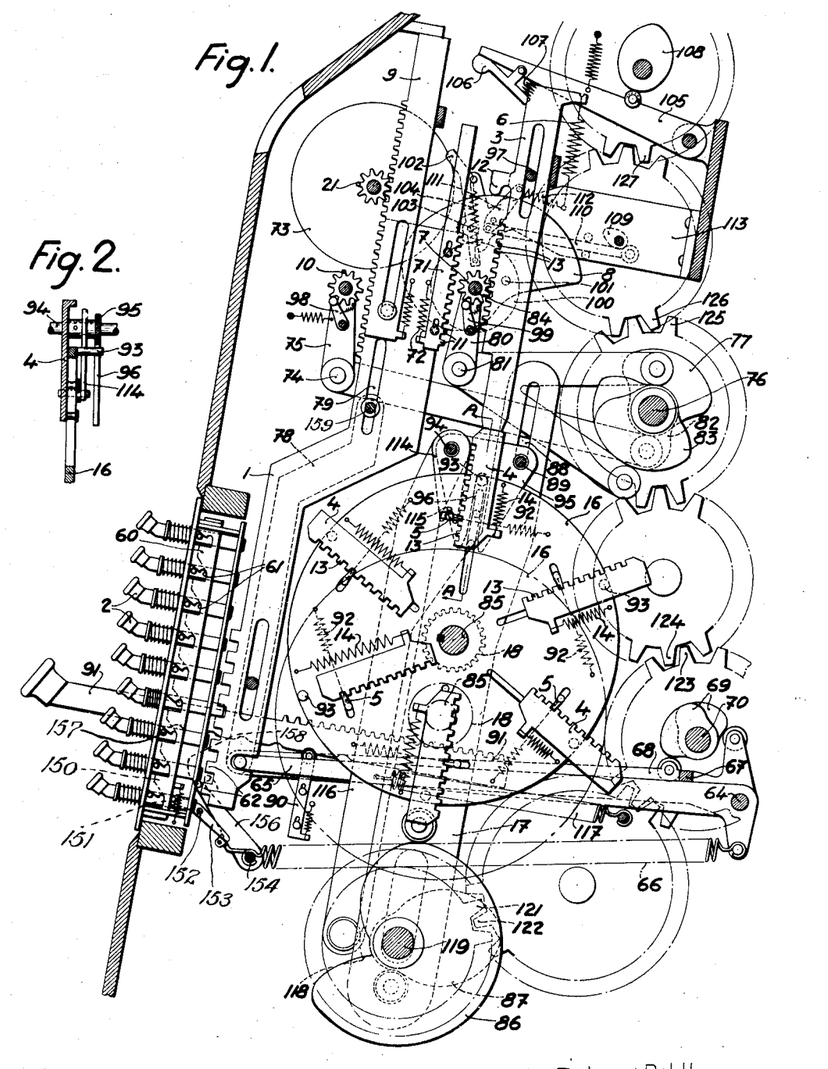
Fig. 1 illustrates one embodiment of the invention, in a side view, partly in section.
Fig. 2 shows a section on line A—A of Figure 1.
Figure 10:
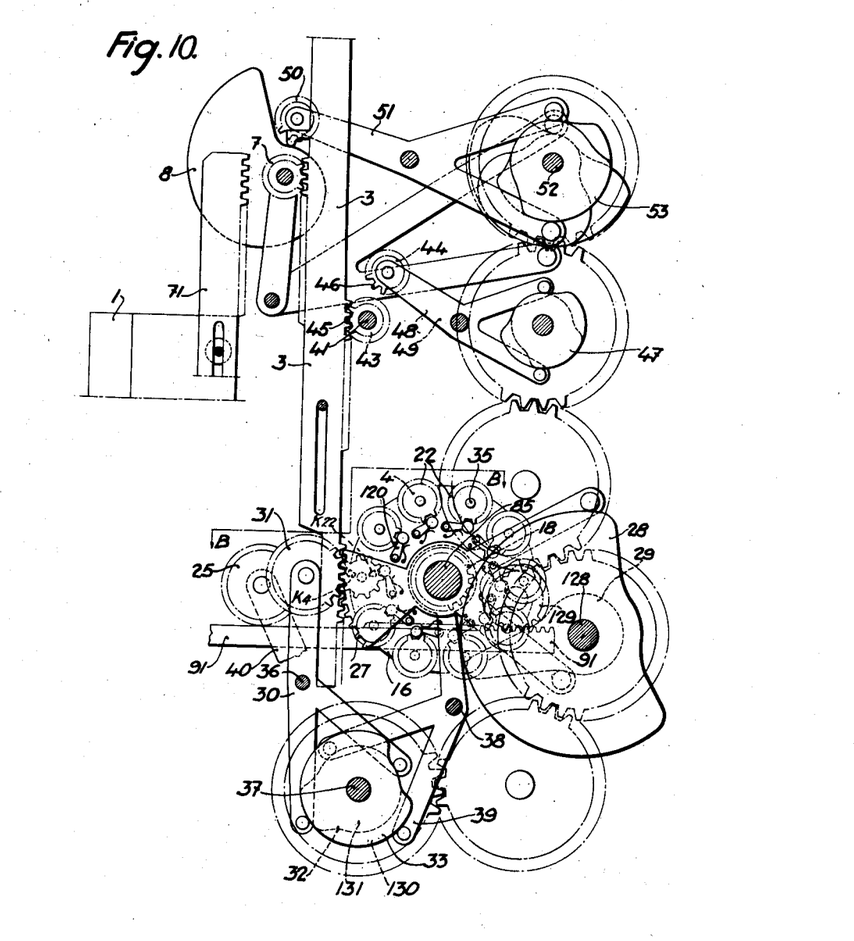
Fig. 10 illustrates a machine according to another embodiment, the machine being shown in side view, partly in section.
Figure 11:
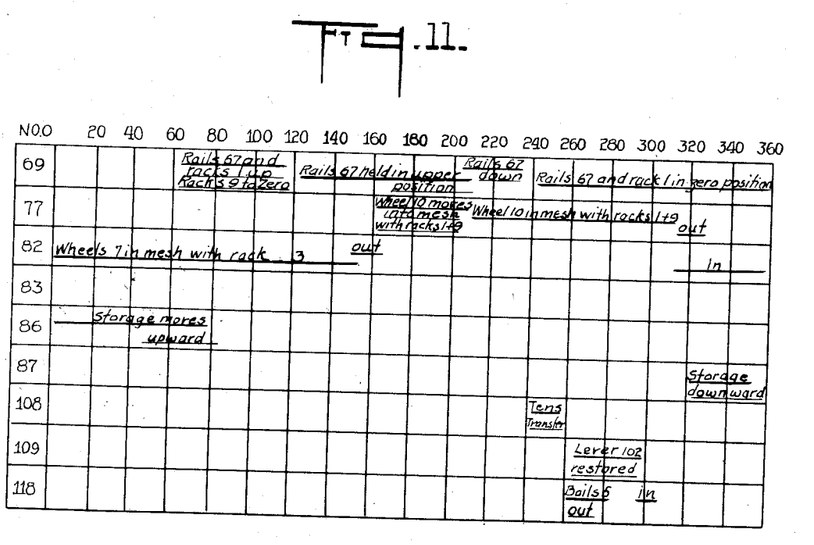
Fig. 11 is a timing chart of the device according to Figs. 1 to 9, in which the heavy horizontal underlinings indicate the duration of the individual cam actions.

For the sake of clearness the members common to both of the embodiments are indicated substantially correspondingly in all figures of the drawings and in Figures 1 and 10 it is assumed that the members cooperating with the "units" wheels of the accumulator are located next to the observer.

Figure 9:
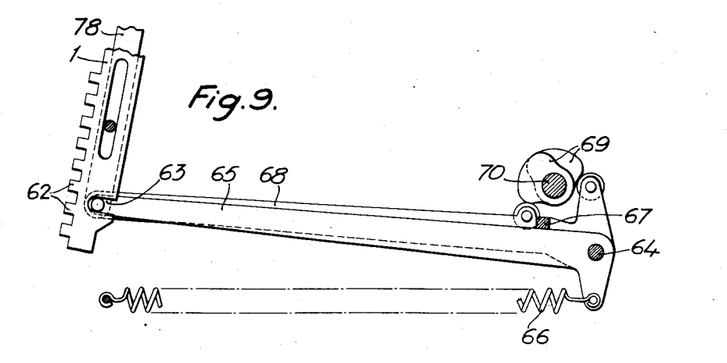

Entry Mechanism (Figs. 1 and 9)

In the drawings 2 indicates amount keys, which are shown only in Figure 1, but which are assumed to be the same also in the constructional form according to Figure 10, and of which there may be several banks. The keys 2 control the differential movement of a plurality of slides 1, below called setting racks. Each key is adapted to be retained in depressed position by means of a pin 157, projecting from its stem and adapted to enter the corresponding one of a number of recesses 61 formed in a spring-actuated locking bar 60. The setting racks are cut, as indicated in Figure 1, to form stops 62. These stops are bent outwardly alternately to the right and left into a vertical plane with similarly extending flanges of the shanks of respective keys. Each setting rack is equipped with a recess 63 (see Fig. 9), into which extends a two-armed lever 65, which is oscillatable on a shaft 64 and which, by means of a spring 66, tends to displace the respective setting rack 1 upwards. Against the action of the springs 66 the levers 65 are held in their lower inoperative positions by a rail 67, which is fixed between two arms 68, located adjacent the two side walls of the machine, respectively, and also mounted on shaft 64. Said arms, by rotating cam discs 69 attached to a shaft 70, are adapted to be put into an oscillating motion of such a length that each setting rack has the possibility of performing a displacing movement corresponding to the length of the key banks. Each bank of stems of the keys 2 has in addition to the spring-actuated locking bar 60 a slidable zero pawl releasing bar 150 which is articulated at 151 to one end of a two-armed lever 153 pivoted on a shaft 152, the other end of the said lever being adapted to cooperate with a pin 155, secured to a spring-actuated arm 156 pivoted on a second shaft 154. Each bar 150 is provided with a plurality of cam surfaces, one adjacent each pin 157. When upon depression of any key 2 the pin 157 of the depressed key acts upon the corresponding cam surface of the bar 150, the latter is upwardly displaced and a pin 158 secured to the arm 156 is forced out of the way of the stops 62 of the respective setting rack 1 against the before-mentioned spring action. If, on the other hand, no key is depressed the pin 153 remains in the position indicated in Figure 1 in dot-dashed lines and prevents the respective setting rack from performing an upward displacement. From the above it is clear that each setting rack 1 has the possibility, during the upward movement of the rail 67, by the action of the springs 66 to be moved upwards and be caused to contact with the depressed key 2. During the downward-directed movement of the rail 67, however, all of the adjusted setting racks are again returned to the initial position.

Figure 4:
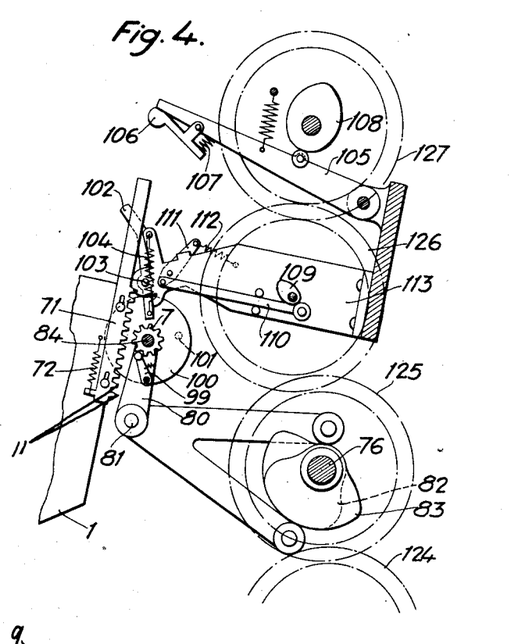
Figure 5:
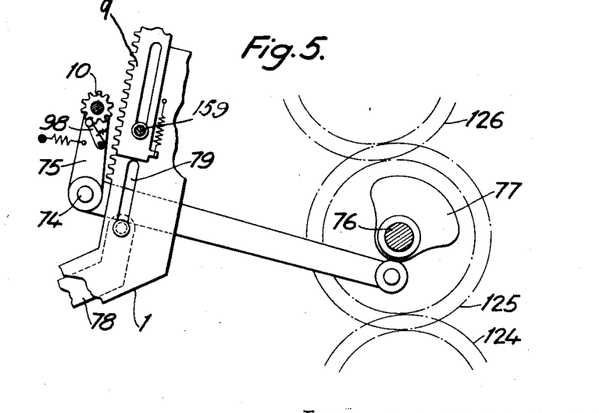

Mechanism for registering entered values (Figs. 1, 4 and 5)

On each setting rack 1 there is provided a slide 71 (see Fig. 4) equipped with teeth 11. By means of guide grooves and guide pins the said slide is displaceable relatively to the setting rack, but by means of a spring 72 it is normally held in the position shown in Figs. 1 and 5. 9 (Figure 1) indicates an indicator rack the teeth of which mesh with a toothed wheel 21, which is connected with a rotatable indicator 73 and which in the drawing is in zero position. A clutch wheel 10 is adapted to simultaneously engage with the teeth of the indicator rack and with the teeth of the setting rack 1, before the downward movement of the latter has begun. For this purpose all clutch wheels 10 are rotatably mounted on a shaft connecting two angular levers 75, located adjacent the two side walls of the machine, respectively, and oscillatable on axle ends 74. The oscillating movements of the levers 75 are obtained by means of a cam disc 77 attached to a rotatable shaft 76. The indicators 73, after each working stroke of the machine remain in the angular positions into which they have been brought by the downward movement of the indicator racks 9 and are restored to zero at the beginning of the next working stroke of the machine. For this purpose two shiftable link members 78 are articulated to the ends of the arms 68, respectively, the said members being connected with one another by means of a transverse rod 159 guided in slots 79 provided in the setting racks 1. When the arms 68 at the beginning of the new working stroke perform an upward movement, the links 78 are carried along. During this operation the rod 159 forces all those indicator racks 9 that have assumed other than zero positions upwardly to their upper end positions, indicators 73 being turned around until they have reached the angular positions corresponding to zero.

*Accumulator wheels (Figs. 1 and 4).*—The wheels of the "total" accumulator, or as they are called below, the single accumulator wheels 7, are rotatably mounted on a shaft 84 (see Fig. 4) connecting two angular levers 80, which are carried by two axle ends 81, located adjacent the two side walls of the machine, respectively. When rotating two cam discs 82, 83, which cooperate with the levers 80 and are attached to the shaft 76, the single accumulator wheels 7 may be caused to alternately cooperate on one hand with the slide or rack 71 and on the other with a rack 3, which is hereinafter described. The cam discs 77, 82 and 83 are so shaped that simultaneously with the clutch wheels 10 engaging the setting racks 1 and the indicator racks 9 the single accumulator wheels 7 engage the slides 71 of the setting racks 1.

Storage mechanism and account selector (Figs. 1, 3, 7 and 8)

In the embodiment illustrated in Figures 1 to 9 the storage sets 4 consist of slides, which are radially displaceable on a number of discs 16 corresponding to the number of setting racks 1. In the case in question, in which there are six slides for each disc, each slide is assumed to correspond to one given account. All discs 16 are attached to a shaft 85 rotatably disposed between displaceable slides 17, to which shaft there is attached also a toothed wheel 18 (see Fig. 7).

By means of cam discs 86, 87 the slides 17 are put into a reciprocating motion. A stationary shaft 89 projecting through guide grooves 88 provides for the guiding of the slides 17. The toothed wheel 18 is adapted, when the shaft 85 assumes the position indicated by dash-and-dot lines in Figure 1, to engage with a rack 91 (see Fig. 3), which can be displaced and set to various positions by means of a ratchet mechanism 90, by means of which rack the discs 16 can be rotated and be adjusted to the position corresponding to the account desired.

Each slide 4 is provided with a number of recesses corresponding to the numeral values 0—9 (see Fig. 3) and can be locked in different positions, corresponding to different numeral values, by means of a bail 5, adapted to be introduced into the said recesses. The back 5 of a pin, which is displaceable in a groove in the disc and which by a spring 92 is urged to engage with the recesses of the slide. Draw springs 14 tend to displace the slides, when the same are liberated, to positions corresponding to the numeral value "nine." According to the invention the storage sets and the slides 4, respectively, may be put into driving connection with the single accumulator wheel 7 as has been indicated above. The transfer mechanism by means of which said driving connection is established is described hereinafter in connection with an example of the mode of operation of the device.

Figure 6:
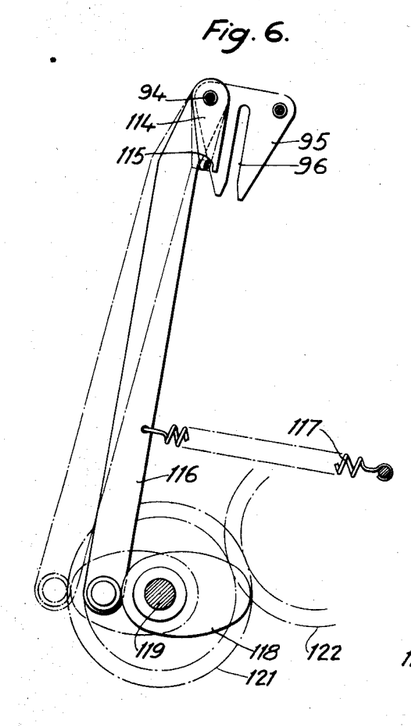

In the rest positions, the discs 16 are in their lower initial positions, which are indicated in dash-and-dot lines in Figure 1, and by means of the rack 9 the discs 16 are set to a position corresponding to the account, in which one or more new items are to be booked or stored. When this setting has been done the discs 16 are moved upwards by the slides 17 and the cam discs 86, 87. In order that the discs shall keep their positions during this movement guide pins 93 are provided on the discs 16 in radial alignment with slides 4. A triangular member 95 is disposed above and adjacent each disc 16, said member being attached to the shaft 89 and to a shaft 94 and provided with a guide groove 96 (see Fig. 6). The pin 93, which corresponds to the selected account, enters the said guide groove when the toothed wheel 18 becomes disengaged from the rack 91.

Figure 3:
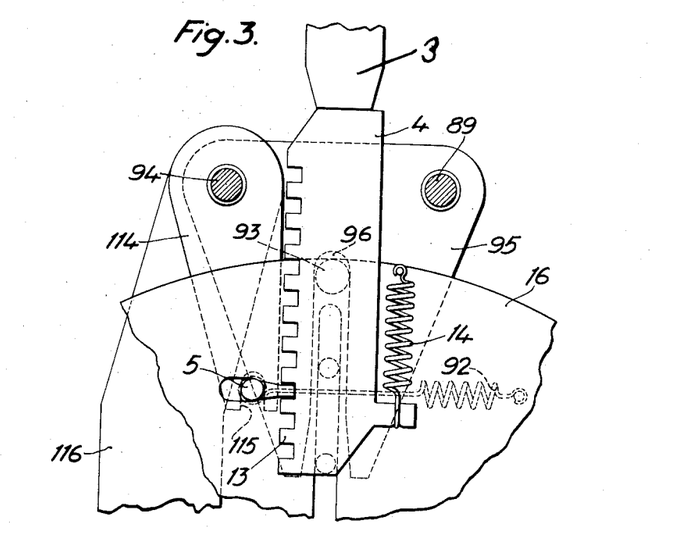
Figs. 3 to 9 show details of the machine of Fig. 1 in separate, partly sectional side views.
Figure 7:
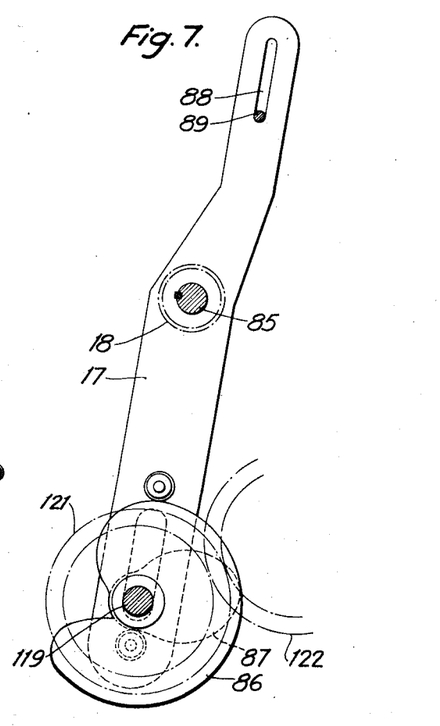
Figure 8:
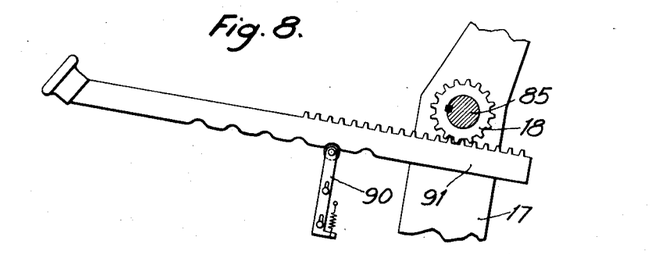

Mechanism for the transfer of stored values to the accumulator wheels (Figs 1, 3 and 7)

Upon upward displacement of the discs 16 the selected slides 4 are positively moved towards the above mentioned racks 3. Each of the racks 3 is provided with teeth 13 corresponding to the teeth of the single accumulator wheel 7 which teeth in turn have the same tooth division as the recesses or teeth of the slide 4. Guide members 97 guide the racks 3 during their displacement. A draw spring 6 urges each rack 3 to assume a position corresponding to the numeral value "0" and consequently the single accumulator wheel 7 being in engagement with the rack 3 in the initial position also assumes the zero position. When now the discs 16 are moved upwards and, as in the present case, the selected slide 4 on the disc 16 corresponding to the "units" rack, is locked in the recess corresponding to the numeral value "seven" the rack 3 will be displaced seven units thereby correspondingly adjusting single accumulator wheel 7 before the disc 16 has reached its upper terminal position. Together with the single accumulator wheel 7 a cam disc 8, is adjusted which is connected with the single accumulator wheel. The functions of the cam disc 8 will be described in detail later on.

*Transfer of entered values to the accumulator wheels (Fig. 1)*

If, as in the present example, the key 2 of the "units" bank, which corresponds to the numeral value "four" is depressed, the corresponding setting rack 1, by the actuation of the respective contracting spring 66, is moved upwards to the position corresponding to the depression of the key, whereupon the clutch wheel 10, the various positions of which are fixed by means of a spring-actuated ratchet 98, connects the setting rack 1 in question with the corresponding indicator rack 9. Approximately simultaneously with the latter movement, the single accumulator wheel 7 engages with the teeth 11 of the slide 71 carried on the setting rack 1. During the motion of the single accumulator wheel 7 towards the setting rack the said single accumulator wheel 7 is held against rotation by a spring-actuated ratchet 99 and the rack 3 maintains its position by resting against the still locked slide 4. During the downwardly directed movement of the rail 67, the setting rack 1 and the slide 71 are displaced downwardly four units, whereby the single accumulator wheel 7 and the disc 8 are rotated simultaneously and correspondingly. Thus, an addition of 7+4 takes place and the "units" single accumulator wheel 7 and also the corresponding disc 8 assume positions corresponding to the unit numeral "one" of the sum "eleven."

*Tens transfer device (Figs. 1 and 4)*

Of course, a transfer of tens from the "units" accumulator wheel to the "tens" accumulator wheel takes place in the above described calculating operation. For this transfer of tens any suitable tens transfer device can be used in the machine according to the invention, such as the device described in the U. S. application No. 675,989, filed on June 15, 1933, but I have preferred in Figure 1 of the drawings to illustrate my device, which is more particularly described in my U. S. application No. 22,148, filed on May 18, 1935, and which hereinafter, therefore, is only briefly described.

With "units" accumulator wheel 7 is rigidly connected a disc 100, provided with a pin 101 (see Fig. 4). Said pin, when the wheel passes from "nine" to "zero", actuates one end of a two-armed lever 102, which is oscillatable on a shaft 103. During this operation said lever is oscillated against the action of a dead center spring 104 from the position shown in the drawing to an opposite position of oscillation, not shown in the drawing. In the latter position the upper end of the lever 102 will cooperate with a tens transfer member, comprising an up-and downwardly swinging arm 105 having pivoted thereto a two-armed lever 106, which by means of a spring 107 is held in the position shown in the drawing. When the racks 1 have been returned to their normal positions, a cam disc 108 imparts to the free end of the arm 105 an oscillating motion corresponding to nine tooth divisions. If the lever 102 has been previously displaced, one end of the lever 106, on the downward stroke of the latter, hits the upper end of the lever 102, whereby an oscillating motion is imparted to the lever 106, the other end thereof being caused to strike the top of the slide 71 on the "tens" setting rack 1 and to displace the same downwardly against the action of the spring 72 for a distance corresponding to one tooth division. Thus, the "tens" accumulator wheel in engagement with said slide receives a rotating movement corresponding to one tooth division and a ten has been transferred.

The lever 102 is returned into its inoperative initial position by means of a link member 110, which is put into a reciprocating motion by a cam 109. The link member 110 is connected with an oscillatable member 111, which is adapted to restore the lever 102 to its initial position. Member 111 is urged by a spring 112 to assume normally the position shown in the drawing. The lever 102 and also the members 111 are carried by stationary frame parts 113.

*Mechanism for transferring to the storage device values accumulated on the accumulating wheels (Figs. 1, 3, and 6)*

Returning to the above described calculating operation the slides 4, which have been moved into operative position with the discs 16, have been liberated approximately simultaneously with the last mentioned adjustment of the single accumulator wheel. The liberation of the selected slide 4 is effected by means of arms 114 (Fig. 6), which are attached to the rotatable shaft 94 and disposed above and adjacent the individual discs 16, respectively. Each arm 114 is provided with a groove 115, which the respective bail 5 enters when the discs 16 are moved to the upper position (see Fig. 3). One end of an arm 116 (Fig. 6), which is also rigidly connected with the shaft 94 is urged, by a draw spring 117 against a cam disc 118 attached to the shaft 119 carrying the cam discs 86, 87. When the shaft 119 is rotated, the cam 118 swings the arm 116, which latter imparts to the shaft 94 such a rotating motion that the arms 114 withdraw the bails 5 from engagement with the slides 4. The selected slide 4 provided on the disc 16 corresponding to the "units" setting racks 1 is, in the drawing, locked in a position corresponding to the numeral value "seven" (see Fig. 3). When the said slide, however, is now released the stronger spring 6 associated with the rack 3, overcomes the action of the spring 14 of the said slide 4, and, the slide 4 is displaced downwards by the rack 3. This downward movement ceases when a stop 12 provided on the rack 3 hits the periphery of the cam disc 8 connected with the single accumulator wheel 7. The cam disc 8 has its profile formed in such a manner, that by cooperation with stop 12 on rack 3, the latter is arrested in a position corresponding to the numeral value accumulated on the single accumulator wheel 7. As in the present example the "units" accumulator wheel 7 and the "units" cam disc 8 now occupy a position corresponding to the numeral value "one," the slide 4 will also assume a position corresponding to the value "one." The bail 5 can now again be moved into engagement with the slide 4, whereby the latter is locked again.

In this connection it should be pointed out that in the cases in which the initial position of any slide 4 corresponds to a value lower than that corresponding to the final position of the cam disc 8 and rack 3, the slide 4, when liberated, will be moved upwardly by means of its spring 14, until it rests against the rack 3. Under such conditions the position of the rack 3 depends exclusively upon the position of the cam disc 8 and is altered by the movements of the latter during the time when the single accumulator wheel 7 is out of engagement with the rack 3.

*Resetting operation (Fig. 1)*

Continuing with the example for the mode of operation of the machine, the single accumulator wheel 7, after the slide 4 having been locked, re-engages the teeth 13 of the rack 3. In the present case the tooth of the numeral rack corresponding to the numeral value "one" thus engages the rack 3, the said numeral value corresponding to the space between two teeth. If now, after completed addition, the storage sets and the disc 16 are moved in the downward direction in order to assume the rest position the rack 3 will accompany this motion and the single accumulator wheel, by its engagement with the teeth 13, will be turned. In this case the single accumulator wheel 7 will be turned only one step since the rack, after having moved one step, has reached its zero position. The single accumulator wheel as well as the cam disc 8 will then, of course, simultaneously assume their zero positions. The machine may now be used again.

*Sum indication (Figs. 1, 4)*

If it is desired to obtain the sum of all the addenda booked on an account the said account is set in the manner stated above by means of the rack 91 and the slide 17 the discs 16 are displaced upwards until the slides corresponding to the said account have been brought into operative position. As all the slides 4 of the account now are held locked the slides will upwardly displace the racks 3 from their lowest positions for a distance corresponding to the setting of the slides. The single accumulator wheels 7, which at this position by the shifting of the cam discs 32, 33 have been brought into engagement with the teeth 13 of the slides 3, are then rotated and adjusted to the numeral value corresponding to the positions of the slides. The discs 100 rigidly connected with the single accumulator wheels 7, transfer the movements of the latter to indicator wheels (not shown) which thus show the total entered into the slides 4 of the account in question.

If it is desired to reset the retainers to zero, the machine is caused to perform a zero stroke, i. e. all the accumulator wheels 7 are caused to assume zero positions by entering complementary values. The selected retainers 4 are then restored to zero by the racks 3, when the bails 5 are withdrawn from the slides 4.

In the above described embodiment the shaft 110 is a driving shaft, from which motion is transmitted via toothed wheels 121—127 to the shafts carrying the various cam discs.

In the embodiment according to Fig. 10 I have left out the members such as the key bank and tens transfer mechanism which are not so important for the invention but are shown in Fig. 1 to illustrate the complete way of functioning of the machine. In the embodiment according to Fig. 10 I may, moreover, preferably use my tens transfer mechanism disclosed in the U. S. appln. No. 78,353 filed on May 7, 1936. In the hereinafter described embodiment the accumulating members are turnably and adjustably mounted on the discs 16 and, instead of consisting of radially displaceable slides as in the embodiment described above, the said members consist of toothed wheels which below will be called setting wheels. By this modified method of mounting and embodying the said members it is possible to provide much more storage members around the periphery of a disc 16, the size of which is given, than if they consist of displaceable slides. Moreover, it is possible to reduce the friction resistance and to obtain a more reliable function of the members in question.

In the embodiment in question it is shown how ten setting wheels 4 are mounted around the periphery on one side only of each disc 16, the diameter of the said disc being considerably smaller than that of the disc which would be used if displaceable slides were used. Locking members 123, serving to retain the setting wheels 4 in the adjusted position cooperate with the said wheels 4, and consisting of spring-actuated ball locking members. Each setting wheel 4 is provided with a shoulder, or abutment K4 or the like. The said abutment is adapted to cooperate with another abutment K22 which is secured on a toothed wheel 22 concentric with the setting wheel 4 and mounted on the shaft 35 of the said wheel 4. By means of a toothed sector 27, which is oscillatably mounted on the shaft 85 of the disc 16, and a toothed wheel 31, which is adapted to connect the toothed sector 27 with the toothed wheel 22, the latter is given a rotating movement corresponding to nine tooth divisions. The toothed sector is then actuated by cam discs 28, 29 mounted on a shaft 128 and at the same time the toothed wheel 31, which is mounted on an arm 30 oscillatable about a shaft 36, is brought by cam discs 32, 33, which are mounted on a shaft 37, into engagement with the toothed sector 27 and the toothed wheel 22. The shaft 85 carrying the discs 16 is not slidably mounted as in the embodiment first described but is mounted on an arm 39 oscillatable about the shaft 38, which arm by means of the cam discs 130, 131 secured on the shaft 37, may be made to rock either the setting wheels 4 of the discs 16 in and out of driving engagement with the rack 3 or the toothed wheel 18 on the shaft 85 in and out of driving engagement with a toothed wheel 129 which is in permanent engagement with the rack 91. The wheels 4 and 22 are adapted to be connected together by a clutch wheel 25 which is mounted on an arm 40, which is also oscillatable about the shaft 36, and which is guided by cam discs (not shown) secured to the shaft 37. The functions of the device of Fig. 10 are substantially similar to those of the device according to Figs. 1 to 9.

Having now described my invention, what I claim as new and desire to secure by Letters Patent is:

1. In a calculating machine, the combination with a totalizer system comprising a single totalizer wheel in each denomination, a plurality of storage sets each having a movable storage member for each denomination, and means to couple any selected storage set to said totalizer system for transferring values to and receiving values from the latter, of a carrier for said storage sets, comprising a single shaft projecting through all denominations and a disc for each denomination keyed to said shaft, each of said discs carrying peripherally distributed thereon all the storage members belonging to one denomination, the storage members of the same set being disposed in alignment, and means to rotate said shaft to bring the selected storage set in operative position relative to said coupling means.

2. A calculating machine, as claimed in claim 1, in which said means to rotate said shaft include a pinion fixed to said shaft and an adjustable rack arranged for cooperation with said pinion.

3. A calculating machine, as claimed in claim 1, in which said shaft is reciprocally mounted, comprising further means to reciprocate said shaft and carrier discs towards and away from said coupling means.

4. A calculating machine, as claimed in claim 1, in which said storage members are mounted radially displaceable on said discs.

5. A calculating machine, as claimed in claim 1, in which said coupling means includes in each denomination a rack having a stop provided thereon, means to bring the corresponding totalizer wheel alternatively into and out of mesh with said rack, and a cam member connected with said totalizer wheel and having a cam surface adapted for cooperation with said stop on said rack so as to retain the latter in a position corresponding to the numeral value accumulated on the totalizer wheel when the latter is out of mesh with said rack.

TORD OLOF RICKARD DAHLBERG.